(No Model.)

R. S. ROBSON.
COMPOSING STICK.

No. 294,677. Patented Mar. 4, 1884.

Witnesses.
S. N. Piper
E. B. Pratt

Inventor.
Robert Stowe Robson.
by R. H. Eddy atty.

UNITED STATES PATENT OFFICE.

ROBERT STOWE ROBSON, OF CAMBRIDGEPORT, ASSIGNOR, BY MESNE ASSIGNMENTS, TO HIMSELF, AND JOHN LOUGHREY, OF EAST CAMBRIDGE, MASSACHUSETTS.

COMPOSING-STICK.

SPECIFICATION forming part of Letters Patent No. 294,677, dated March 4, 1884.

Application filed February 3, 1883. (No model.)

*To all whom it may concern:*

Be it known that I, ROBERT STOWE ROBSON, of Cambridgeport, in the county of Middlesex, of the Commonwealth of Massachusetts, have invented a new and useful Improvement in Printers' Composing-Sticks; and I do hereby declare the same to be described in the following specification and represented in the accompanying drawings, of which—

Figure 1:
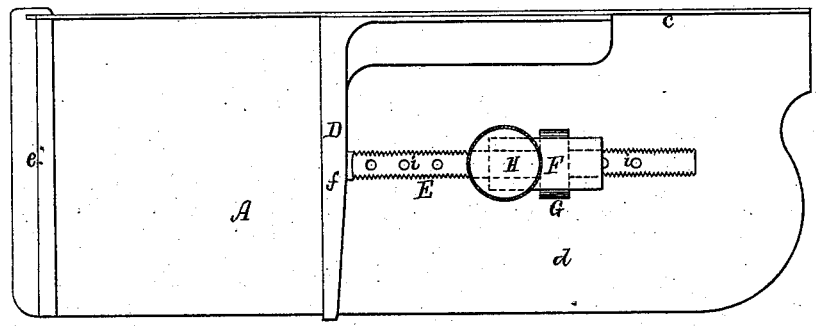
Figure 2:
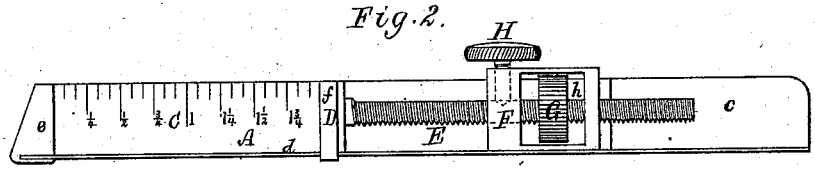
Figure 3:
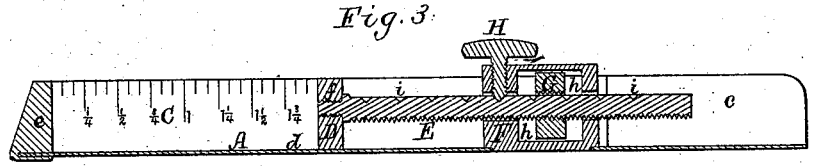
Figure 4:
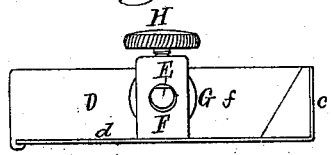

Figure 1 is a top view, Fig. 2 a side elevation, and Fig. 3 a longitudinal and median section, of a "composing-stick" provided with my invention, the nature of which is defined in the claim hereinafter presented. Fig. 4 is an end view of the said stick.

The troughed portion or type-receiver of the stick (shown at A) is of the ordinary form and construction, it being composed not only of a metallic plate, a part, c, of which is bent up at a right angle to the remainder d, but of an end piece or abutment, e, the latter being arranged at one end of the plate and recessed or grooved to receive such end. On the inner surface of the turned-up part c there is a scale, C, of inches and twelfths of inches. Within the receiver A is the adjustable right-angular gage D, which rests on the bottom of the receiver and clasps it at its outer edge, in manner as shown in Figs. 2 and 4. The said gage also bears against the inner side of the turned-up part c. From the middle of the part f of the gage a screw, E, extends rearward through a standard, F, erected on and fixed to the bottom of the receiver. This screw does not screw into the standard, but engages with a nut, G, arranged within the standard, or a slot, h, made through it, and a little wider than the nut. The screw E on its top is flat, and has in it a series of conic recesses or notches, i, each being adapted to receive and fit to the conical point or lower end of a clamp-screw, H, that is screwed down into the standard. The notches in the top of the screw are at equal distances apart—that is to say, each notch at its center is a quarter of an inch from the center of each next adjacent notch. The series of notches with the pointed clamp-screw are for quickly determining the positions of the gage for standard distances of it from the abutment. The adjusting-nut G is for adjusting the gage for intermediate or other distances of it from the abutment when the point of the screw is not directly over one of the notches. The nut also answers as a stop to prevent endwise movement of the gage should the clamp-screw accidentally become loosened in a notch.

By having the slot in the standard F about double the width of the nut G, the said nut can easily be moved away from either vertical side of the slot, so as not to interfere with the adjustment of the gage by the clamp-screw. When the adjustment is to be made by the nut, the clamp-screw is to be supposed to be out of engagement with a notch of the screw of the gage, the nut in such case being turned so as to bear against one side of the slot. After the adjustment may have been made by the nut, the clamp-screw may be set down so as to bind the gage in position. The nut is not to bear at the same time against both sides of the standard, but to be revoluble on the screw and movable with such in the standard, to facilitate the engagement of the clamp-screw H with one of the notches in the screw E. The scale is necessary to enable the gage to be adjusted to distances intermediate of the main or primary divisions of it, which are equal in distances apart to the centers of the notches in the screw. Having adjusted the gage to any of the subdivisions of the scale by means of the nut, as described, the clamp-screw may be used in conjunction with the nut to hold the gage in position.

A composing-stick constructed as described has advantages over the sticks as heretofore made and used.

I claim—

The type-receiver provided with the slotted standard and the nut and pointed clamp-screw, adapted thereto as described, in combination with the adjustable gage having the screw furnished with notches and extended from it through the standard and nut, and to operate therewith and with the clamp-screw as explained.

ROBERT STOWE ROBSON.

Witnesses:
R. H. EDDY,
E. B. PRATT.